(12) United States Patent
Ferdous et al.

(10) Patent No.: US 11,016,059 B2
(45) Date of Patent: May 25, 2021

(54) MAGNETIC WET BENCHES WITH AUTOMATED SAMPLE COLLECTION

(71) Applicant: ILLINIOS TOOL WORKS INC., Glenview, IL (US)

(72) Inventors: Sakif Bin Ferdous, Skokie, IL (US); Wyatt M. Burns, Woodridge, IL (US); David John Fry, Evanston, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 90 days.

(21) Appl. No.: 16/366,117

(22) Filed: Mar. 27, 2019

(65) Prior Publication Data

US 2019/0302056 A1    Oct. 3, 2019

Related U.S. Application Data

(60) Provisional application No. 62/648,756, filed on Mar. 27, 2018.

(51) Int. Cl.
*G01N 27/82* (2006.01)
*G01N 27/84* (2006.01)
*G01N 27/85* (2006.01)

(52) U.S. Cl.
CPC ............ *G01N 27/82* (2013.01); *G01N 27/84* (2013.01); *G01N 27/85* (2013.01)

(58) Field of Classification Search
CPC ........ G01N 27/82; G01N 27/84; G01N 27/85; G01R 33/0011; G01R 33/00; G01R 33/02; G01R 33/04
See application file for complete search history.

(56) References Cited

U.S. PATENT DOCUMENTS

| | | | | |
|---|---|---|---|---|
| 3,656,054 A | * | 4/1972 | Forster ................. | B82Y 15/00 |
| | | | | 324/213 |
| 2012/0068696 A1 | * | 3/2012 | Mizutani ............... | G01N 27/82 |
| | | | | 324/234 |
| 2014/0083211 A1 | * | 3/2014 | Moon ..................... | G01N 1/28 |
| | | | | 73/863.11 |
| 2017/0227496 A1 | * | 8/2017 | Judd ...................... | G01N 27/82 |
| 2019/0145934 A1 | * | 5/2019 | Feng ..................... | G01N 29/04 |
| | | | | 324/222 |

FOREIGN PATENT DOCUMENTS

| | | |
|---|---|---|
| DE | 19819066 | 11/1999 |
| DE | 102006003182 | 8/2007 |

OTHER PUBLICATIONS

International Search Report and Written Opinion for PCT/US2019/024318, dated Jun. 24, 2019. (11 pages).

* cited by examiner

*Primary Examiner* — Jermele M Hollington
*Assistant Examiner* — Taqi R Nasir
(74) *Attorney, Agent, or Firm* — McAndrews, Held & Malloy, Ltd.

(57) ABSTRACT

Systems and methods are provided for implementing and utilizing magnetic inspection machines with true gauss magnetic measurements.

14 Claims, 3 Drawing Sheets

US 11,016,059 B2

MAGNETIC WET BENCHES WITH AUTOMATED SAMPLE COLLECTION

CLAIM OF PRIORITY

This patent application makes reference to, claims priority to and claims benefit from U.S. Provisional Patent Application Ser. No. 62/648,756, filed on Mar. 27, 2018. The above identified application is hereby incorporated herein by reference in its entirety.

BACKGROUND

Non-destructive testing (NDT) is used to evaluate properties and/or characteristics of material, components, and/or systems without causing damage or altering the tested item. Because non-destructive testing does not permanently alter the article being inspected, it is a highly valuable technique, allowing for savings in cost and/or time when used for product evaluation, troubleshooting, and research. Frequently used non-destructive testing methods include magnetic-particle inspections, eddy-current testing, liquid (or dye) penetrant inspection, radiographic inspection, ultrasonic testing, and visual testing. Non-destructive testing (NDT) is commonly used in such fields as mechanical engineering, petroleum engineering, electrical engineering, systems engineering, aeronautical engineering, medicine, art, and the like.

In some instances, dedicated material and/or products may be used in non-destructive testing. For example, non-destructive testing of particular type of articles may entail applying (e.g., by spraying on, pouring into, passing through, etc.) would-be tested article or part material that is configured for performing the non-destructive testing. In this regard, such material (referred as "NDT material" or "NDT product" hereinafter) may be selected and/or made based on having particular magnetic, visual, etc. characteristics suitable for the non-destructive testing—e.g., allowing detecting defects and imperfections in the would-be tested article.

In some instances, conventional approaches for performing certain types of NDT inspections, such as magnetic-particle inspections, may have some shortcomings and/or disadvantages, particularly with respect to real-time control of the machines using during such inspections.

Further limitations and disadvantages of conventional approaches will become apparent to one management of skill in the art, through comparison of such approaches with some aspects of the present method and system set forth in the remainder of this disclosure with reference to the drawings.

BRIEF SUMMARY

Aspects of the present disclosure relate to product testing and inspection. More specifically, various implementations in accordance with the present disclosure are directed to magnetic inspection machines with true gauss magnetic measurements, substantially as illustrated by or described in connection with at least one of the figures, and as set forth more completely in the claims.

These and other advantages, aspects and novel features of the present disclosure, as well as details of an illustrated implementation thereof, will be more fully understood from the following description and drawings.

DETAILED DESCRIPTION

Figure 1:
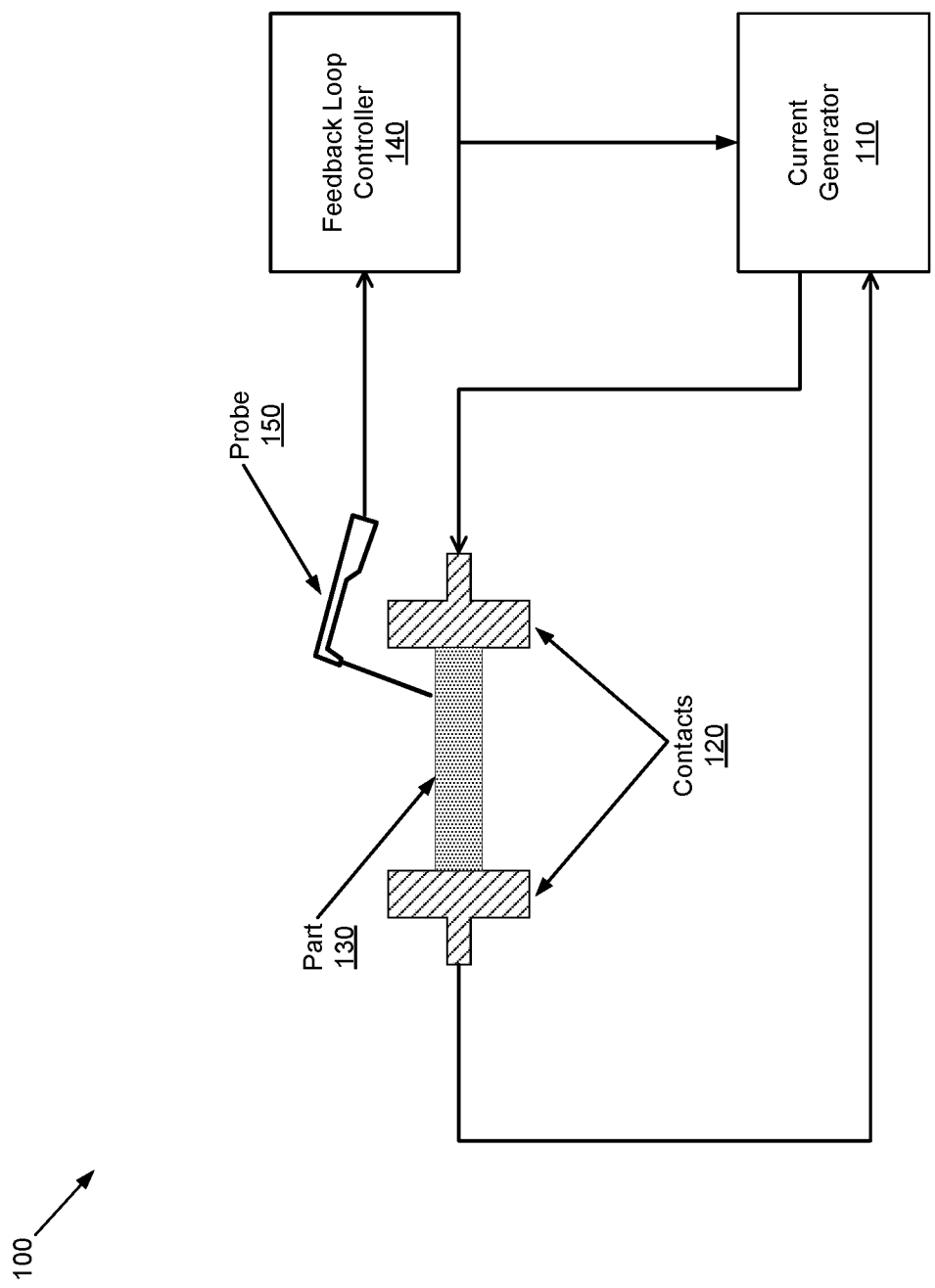
FIG. 1 illustrates an example magnetic inspection machine with true gauss magnetic measurements, in accordance with aspects of the present disclosure.

Various implementations in accordance with the present disclosure are directed to providing enhanced and optimized ways for utilizing magnetic wet bench, particularly with respect to sample collection performed therein.

An example apparatus, configured for magnetic non-destructive testing (NDT) inspection, in accordance with the present disclosure, may include a current generator configured to generate an electric current; one or more electrical contacts configured to apply the electric current to an inspection article during magnetic non-destructive testing (NDT) inspection, with the application of the electric current creating a magnetic field in the inspection article; a magnetic probe configured to obtain gauss readings associated with the inspection article during the magnetic NDT inspection; and a feedback loop controller configured to process the gauss readings; determine one or more adjustments based on processing of the gauss readings; and apply the one or more adjustments to the current generator.

In an example implementation, the magnetic probe may be manually adjusted.

In an example implementation, the magnetic probe may be automatically adjusted.

In an example implementation, the feedback loop controller may be configured to process the gauss readings based on pre-defined criteria.

In an example implementation, the feedback loop controller may be configured to enable modifying the pre-defined criteria.

An example method for conducting a magnetic non-destructive testing (NDT) inspection, in accordance with the present disclosure, may include obtaining during the magnetic NDT inspection, gauss readings associated with an inspection article that may be subjected to the magnetic NDT inspection; processing the gauss readings; determining based on processing of the gauss readings one or more adjustments, where at least one of the one or more adjustments may be configured for controlling electric current applied to the inspection article during the magnetic non-destructive testing (NDT) inspection, and where application of the electric current creates a magnetic field in the inspection article; and applying the one or more adjustments to a source of the electric current.

In an example implementation, the gauss readings may be obtained via a magnetic probe.

In an example implementation, the positioning of the magnetic probe may be adjusted manually.

In an example implementation, the positioning of the magnetic probe may be adjusted automatically.

In an example implementation, the gauss readings may processed based on pre-defined criteria.

In an example implementation, the pre-defined criteria may be modified based on processing of the gauss readings.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code, Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

FIG. 1 illustrates an example magnetic inspection machine with true gauss magnetic measurements, in accordance with aspects of the present disclosure. Shown in FIG. 1 is a magnetic inspection machine 100.

The magnetic inspection machine 100 is configured for use in NDT magnetic-particle inspections, particularly for inspecting articles (e.g., parts, etc.) for defects and/or imperfections, specifically based on magnetic characteristics associated therewith—e.g., where there is cracks or deformities in the to-be-tested part, this would affect the magnetic reading. In this regard, magnetic based inspection entail inducting magnetic field in the inspected part, such as via direct magnetization by applying current(s) into the part—e.g., via electrical elements (referred to as "electrical contacts"). A typical magnetic inspection machine may have engagement components (e.g., head and tail stocks) incorporating the electrical contacts, to engage the part being tested (e.g., with part clamped therebetween, with one of the engagement parts, such as the tail stock being moved and locked into place to accommodate parts of various lengths).

For example, as shown in the example implementation illustrated in FIG. 1, the magnetic inspection machine 100 comprises a current generator 110 that applies electric current(s) to a to-be inspected part 130 via electrical contacts 120. In this regard, various magnetization approaches may be used to magnetize the inspected parts, with some systems allowing for selecting among such options. The magnetization may be achieved using, e.g., AC (alternating current), half wave DC (direct current), or full wave DC (direct current). In some systems, a demagnetization function may be built into the system. For example, the demagnetization function may utilize a coil and decaying AC (alternating current).

Further, while not specifically shown in the particular implementation illustrated in FIG. 1, magnetic inspection machines may comprise additional parts, for performing other/different functions. For example, in some instances, test-related material may be used (e.g., applied to the inspected parts) during magnetic-based inspections, such as to enable and/or facilitate defect detection. These additional components or functions may be determined based on type of the machine and/or inspections performed using the machines.

One example type of magnetic inspection machines is magnetic particle inspection stationary wet benches (or magnetic wet benches). In this regard, when using magnetic wet benches, a wet magnetic particle solution is applied to the part. The particle solution (also called "bath") may comprise visible or fluorescent particles that may be magnetized, allowing for detecting of defects and/or imperfections by exhibit different characteristics in such areas. The particle solution may be sprayed on the part while (or before) the application of current thereto (to magnetize the parts).

In an example inspection use scenario, a part 130 may be engaged via (e.g., clamped between) two the electrical contacts 120. Part preparation measure(s) and/or step(s), as dictated by the type of machine, are performed. For example, when utilizing magnetic wet benches, the magnetic solution is applied to (e.g., sprayed over) the surface of the part 130. The magnetizing current is then provided by the current generator 110, and applied to the part 130 via the electrical contacts 120. Application of the magnetizing current may be done for a short duration, and precautions may be taken to prevent burning or overheating of the part 130. The application of the magnetizing current to the part 130 via the electrical contacts 120 creates a magnetic field in the part 130 (e.g., a circular field flowing around the circumference of the part 130). The magnetic field allows detection of defects in the part 130, based on the magnetic field created therein. For example, when utilizing magnetic wet benches, with the part 130 wet from the magnetic solution, defects, such as cracks, may be detectable as a result of leakage fields from these defects, which attract the magnetic particles in the solution to form indications.

Existing systems may have some shortcomings, however. For example, existing magnetic inspection machines are typically operated based upon amperage settings that require certified technicians to test the part for its gauss reading. In this regard, operators using existing magnetic inspection machines (e.g., magnetic wet benches) currently need to spend time testing parts in each magnetic inspection machine they plan on using, and create a technique sheet for each machine, even if it is for the same part. This is due to the fact that applicable standards or specifications typically require a part reaches a specific gauss rating (e.g., regulatory requirement of 30 Gs around the part), and there may be inconsistencies between the applied amperage and resulting gauss on the part. Thus, instead of creating one technique sheet for a new part to be tested, operators may have to repeat the same exact procedure as many times as magnetic inspection machines they have or use.

Accordingly, in various implementations in accordance with the present disclosure, such issues may be overcome, by incorporating into magnetic inspection machines components for obtaining real-time gauss readings, and for utilizing such readings to continually control other functions in the machine, particularly currents applied to the inspected parts, such as to ensure meeting applicable requirements.

In this regard, solving the issues noted above—particularly by allowing for constant gauss readings and use thereof for controlling amperage related functions (e.g., in feedback manner), may allow for significant improvements over existing machines and/or solutions—e.g., allowing for labor cost savings, process control improvements, and improved reliability (e.g., assuring that parts are magnetized properly). For example, not only would operators only need to write one technique sheet, but that sheet will never change throughout the life of the machine, because gauss reading and related feedback control mechanism will always ensure that the amperage is adjusted so that the part 130 is always properly charged.

In the example implementation shown in FIG. 1, the magnetic inspection machine 100 incorporates a magnetic probe 150 and a feedback loop controller 140, which may be configured for obtaining constant and real-time gauss readings of the part 130 once it is engaged in the machine, and performing corresponding loopback based control based thereon.

The probe 150 may comprise any suitable hardware (including circuitry) for obtaining gauss readings (e.g., a Gaussmeter). The probe 150 may be adjustable to accommodate different part types (or shapes). In this regard, the placement and/or adjustment of the probe 150 may be done manually (by the operator) or automatically (e.g., using suitable components for assessing type and/or shape of the part, and/or for autonomously moving the probe, either based on the autonomous assessment of the parts or otherwise—e.g., based on pre-defined criteria, in response to the operator identifying the part via input component).

The feedback loop controller 140 may comprise suitable circuitry for processing the gauss readings obtained via the probe 150, and for taking control actions based thereon. For example, the feedback loop control 140 may generate, in response to processing the gauss readings, control signals that are applied to the current generator 110, to adjust current(s) applied thereby to the part 130.

By implementing such gauss feedback loop into the machine, amperage may be dialed up (or down) by probing the part for gauss at the same time. The gauss reading allows the machine to autonomously determine when to stop increasing the amperage in a very short period of time, and as a result ensure that the inspected is magnetized to a point within the acceptable range. Further, operation of such machine may be similar to previous machines, because all the work is done automatically (e.g., being handled by feedback loop controller 140). As a result, operators are relieved from their duty of tedious new part testing and repeated technique sheet writing.

Figure 2:
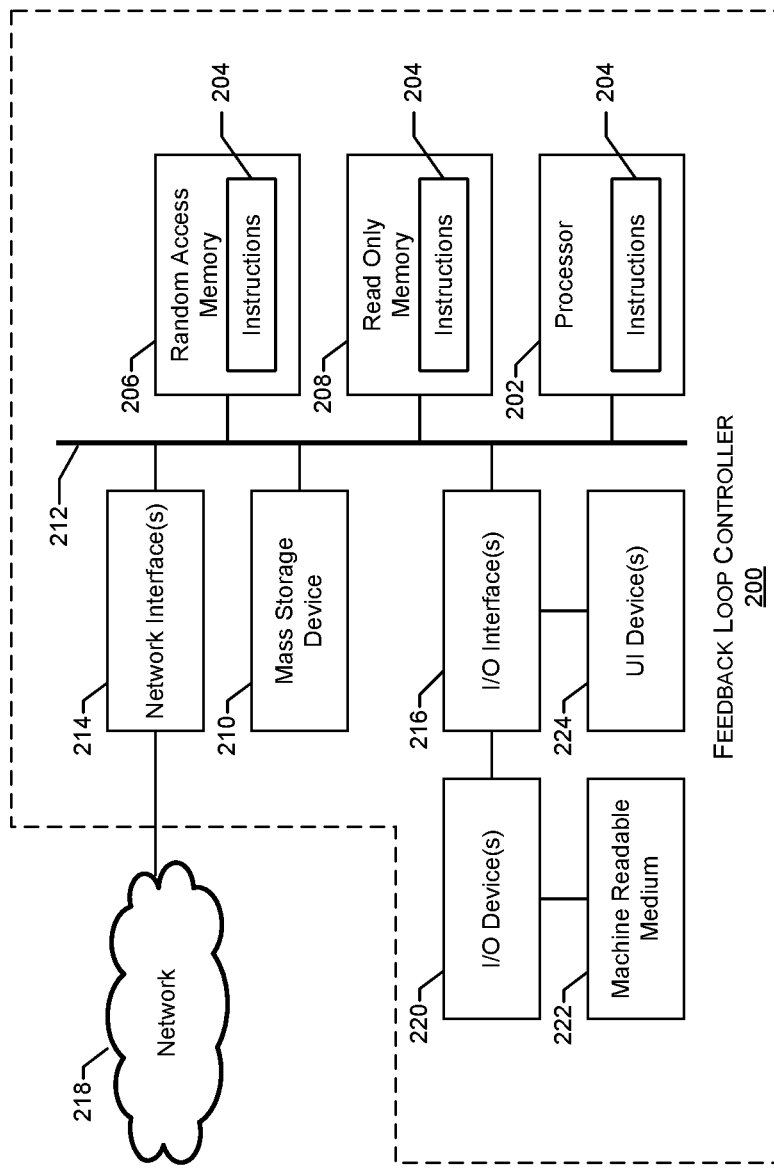
FIG. 2 illustrates an example feedback loop controller, in accordance with aspects of the present disclosure.

FIG. 2 illustrates an example feedback loop controller, in accordance with aspects of the present disclosure. Shown in FIG. 2 is a feedback loop controller 200.

The feedback loop controller 200 may comprise suitable circuitry for implementing various aspects of the present disclosure, particularly by providing feedback loop related control, as described with respect to FIG. 1 for example. In this regard, the feedback loop controller 200 may represented an example implementation of the feedback loop controller 140 of FIG. 1.

As shown in FIG. 2, the feedback loop controller 200 may include a processor 202. In this regard, the example processor 202 may be any general purpose central processing unit (CPU) from any manufacturer. In some example implementations, however, the processor 202 may include one or more specialized processing units, such as RISC processors with an ARM core, graphic processing units, digital signal processors, and/or system-on-chips (SoC).

The processor 202 executes machine readable instructions 204 that may be stored locally at the processor (e.g., in an included cache or SoC), in a random access memory (RAM) 206 (or other volatile memory), in a read only memory (ROM) 208 (or other non-volatile memory such as FLASH memory), and/or in a mass storage device 210. The example mass storage device 210 may be a hard drive, a solid state storage drive, a hybrid drive, a RAID array, and/or any other mass data storage device.

A bus 212 enables communications between the processor 202, the RAM 206, the ROM 208, the mass storage device 210, a network interface 214, and/or an input/output (I/O) interface 216.

The example network interface 214 includes hardware, firmware, and/or software to connect the feedback loop controller 200 to a communications network 218 such as the Internet. For example, the network interface 214 may include IEEE 202.X-compliant wireless and/or wired communications hardware for transmitting and/or receiving communications.

The example I/O interface 216 of FIG. 2 includes hardware, firmware, and/or software to connect one or more user interface devices 220 to the processor 202 for providing input to the processor 202 and/or providing output from the processor 202. For example, the I/O interface 216 may include a graphics processing unit for interfacing with a display device, a universal serial bus port for interfacing with one or more USB-compliant devices, a FireWire, a field bus, and/or any other type of interface.

The example feedback loop controller 200 includes a user interface device 224 coupled to the I/O interface 216. The user interface device 224 may include one or more of a keyboard, a keypad, a physical button, a mouse, a trackball, a pointing device, a microphone, an audio speaker, an optical media drive, a multi-touch touch screen, a gesture recognition interface, and/or any other type or combination of types of input and/or output device(s). While the examples herein refer to a user interface device 224, these examples may include any number of input and/or output devices as a single user interface device 224. Other example I/O device(s) 220 an optical media drive, a magnetic media drive, peripheral devices (e.g., scanners, printers, etc.), and/or any other type of input and/or output device.

The example feedback loop controller 200 may access a non-transitory machine readable medium 222 via the I/O interface 216 and/or the I/O device(s) 220. Examples of the machine readable medium 222 of FIG. 2 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

Figure 3:
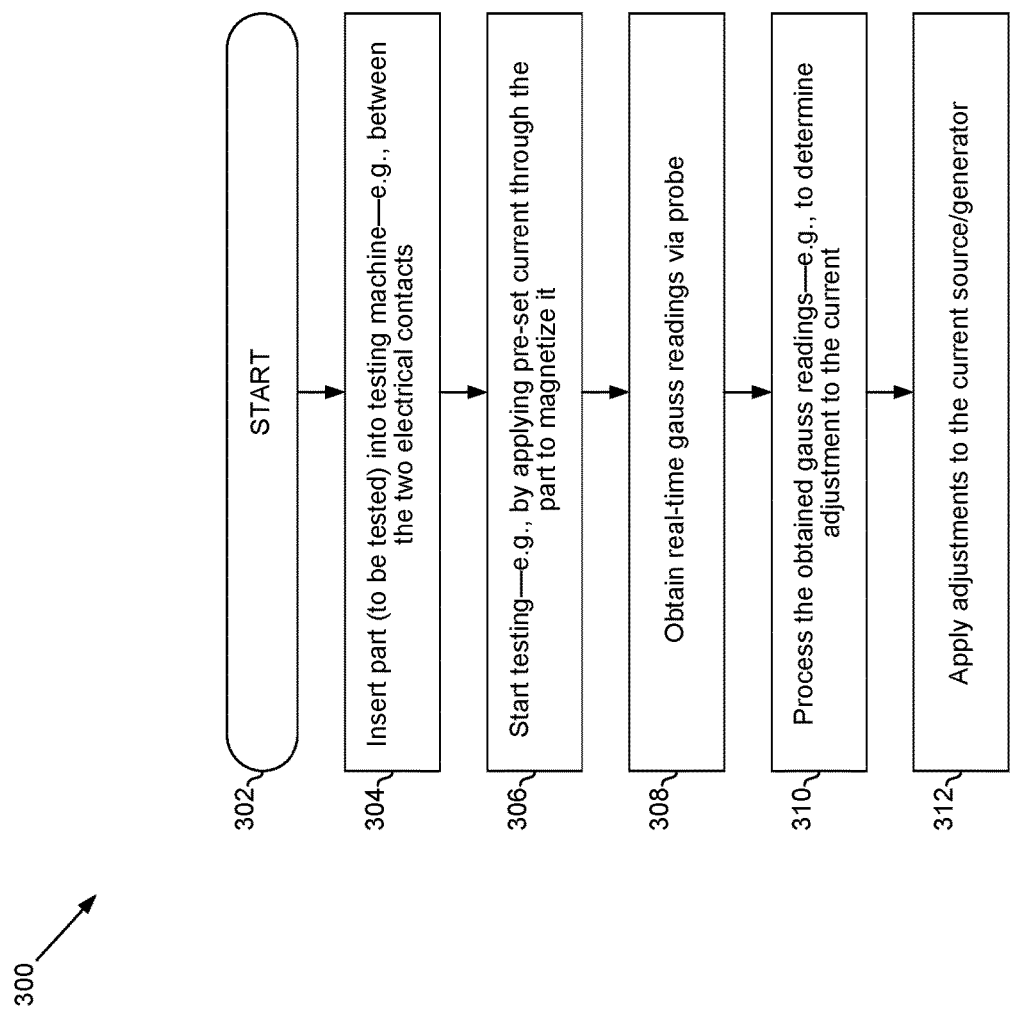
FIG. 3 illustrates a flowchart of an example process for utilizing magnetic inspection machine with true gauss magnetic measurements, in accordance with aspects of the present disclosure.

FIG. 3 illustrates a flowchart of an example process for utilizing magnetic inspection machine with true gauss magnetic measurements, in accordance with aspects of the present disclosure.

Shown in FIG. 3 is flow chart 300, comprising a plurality of example steps (represented as blocks 302-312), which may be performed in and/or using a suitable system (e.g., the magnetic inspection machine 100 of FIG. 1), in accordance with the present disclosure.

After start step 302, in which the machine is setup and configured for operation, in step 304, the part (to be tested) is inserted into testing machine—e.g., the two electrical contacts.

In step 306, testing may be started—e.g., by applying pre-set current through the part to magnetize it.

In step 308, real-time gauss readings may be obtained, such as via a probe position on or near the part.

In step 310, the obtained gauss readings may be processed—e.g., to determine any required adjustments to the current (amperage) applied to the part.

In step 312, adjustments are applied to the current source/generator.

Other implementations in accordance with the present disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various implementations in accordance with the present disclosure may be realized in hardware, software, or a combination of hardware and software. The present disclosure may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various implementations in accordance with the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain implementations, it will be understood by those skilled in the art that various changes may be made and equivalents may be substituted without departing from the scope of the present disclosure. For example, block and/or components of disclosed examples may be combined, divided, re-arranged, and/or otherwise modified. In addition, many modifications may be made to adapt a particular situation or material to the teachings of the present disclosure without departing from its scope. Therefore, it is intended that the present disclosure not be limited to the particular implementation disclosed, but that the present disclosure will include all implementations falling within the scope of the appended claims.

What is claimed is:

1. A magnetic inspection machine, comprising:
   a current generator configured to generate an electric current;
   one or more electrical contacts configured to apply the electric current to an inspection article during magnetic non-destructive testing (NDT) inspection, wherein the application of the electric current creates a magnetic field in the inspection article;
   a magnetic probe configured to obtain gauss readings associated with the inspection article during the magnetic NDT inspection, wherein the magnetic probe is adjustable for enabling adaptive placement based on the inspection article; and
   a feedback loop controller configured to:
      process the gauss readings;
      determine one or more adjustments based on processing of the gauss readings; and
      apply the one or more adjustments to the current generator.

2. The magnetic inspection machine of claim 1, wherein the magnetic probe is manually adjusted.

3. The magnetic inspection machine of claim 1, wherein the magnetic probe is automatically adjusted.

4. The magnetic inspection machine of claim 1, wherein the feedback loop controller is configured to process the gauss readings based on pre-defined criteria.

5. The magnetic inspection machine of claim 4, wherein the feedback loop controller is configured to enable modifying the pre-defined criteria.

6. The magnetic inspection machine of claim 3, comprising an assessment component configured for autonomous assessment of inspection articles, and wherein the magnetic probe is automatically adjusted based on autonomous assessment of the inspection articles via the assessment component.

7. The magnetic inspection machine of claim 3, comprising an input device for receiving user input, and wherein the magnetic probe is automatically adjusted based on user input relating to the inspection article provided via the input device.

8. A method for conducting a magnetic non-destructive testing (NDT) inspection, the method comprising:
   in an inspection setup configured for magnetic NDT inspections:
      obtaining during the magnetic NDT inspection, using a magnetic probe, gauss readings associated with an inspection article that is subjected to the magnetic NDT inspection, wherein the obtaining comprises adaptively adjusting positioning of the magnetic probe based on the inspection article;
      processing the gauss readings;
      determining based on processing of the gauss readings one or more adjustments,
         wherein at least one of the one or more adjustments is configured for controlling electric current applied to the inspection article during the magnetic non-destructive testing (NDT) inspection, and
         wherein application of the electric current creates a magnetic field in the inspection article; and
      applying the one or more adjustments to a source of the electric current.

9. The method of claim 8, comprising adjusting positioning of the magnetic probe manually.

10. The method of claim 8, comprising adjusting positioning of the magnetic probe automatically.

11. The method of claim 8, comprising processing the gauss readings based on pre-defined criteria.

12. The method of claim 11, comprising modifying the pre-defined criteria based on processing of the gauss readings.

13. The method of claim 10, comprising:
   obtaining an autonomous assessment of the inspection article; and automatically adjusting positioning of the magnetic probe the based on the autonomous assessment of the inspection article.

14. The method of claim 10, comprising:

obtaining user input relating to the inspection article; and automatically adjusting positioning of the magnetic probe the based on the user input.

* * * * *